United States Patent

Przymusinski et al.

[11] Patent Number: 6,092,510
[45] Date of Patent: Jul. 25, 2000

[54] METHOD FOR CONTROLLING THE FUEL INJECTION IN AN INTERNAL COMBUSTION ENGINE

[75] Inventors: Achim Przymusinski, Regensburg; Dirk Heinitz, Schönhofen; Arno Friedrich, Regensburg, all of Germany

[73] Assignee: Siemens Aktiengesellschaft, Munich, Germany

[21] Appl. No.: 09/153,210

[22] Filed: Sep. 15, 1998

[30] Foreign Application Priority Data

Sep. 15, 1997 [DE] Germany .......................... 197 40 527

[51] Int. Cl.[7] .................................................. F02M 51/00
[52] U.S. Cl. ............................................ 123/478; 123/492
[58] Field of Search .................................. 123/486, 492, 123/493, 478

[56] References Cited

U.S. PATENT DOCUMENTS

| | | | |
|---|---|---|---|
| 3,628,116 | 12/1971 | Preikschat | 318/590 |
| 4,535,740 | 8/1985 | Ma | 123/435 |
| 4,884,546 | 12/1989 | Sogawa | 123/486 |
| 5,239,974 | 8/1993 | Ebinger et al. | 123/675 |
| 5,241,939 | 9/1993 | Nonaka | 123/492 |
| 5,680,842 | 10/1997 | Schmid | 123/357 |

FOREIGN PATENT DOCUMENTS

| | | |
|---|---|---|
| 4306208A1 | 9/1994 | Germany . |
| 19535056C1 | 10/1996 | Germany . |

*Primary Examiner*—Henry C. Yuen
*Assistant Examiner*—Mahmoud Gimie
*Attorney, Agent, or Firm*—Herbert L. Lerner; Laurence A. Greenberg; Werner H. Stemer

[57] ABSTRACT

A method for controlling an injection of fuel in an internal combustion engine in which steady-state optimum injection parameters, in particular the start-of-injection angle, is corrected for non-steady-state operating phases. The correction is carried out by a transmission element to which the driver's request is fed as an input and correction parameters are determined therefrom. Using the correction parameters, fuel injection parameters obtained from a characteristic diagram that is optimum for steady-state operating conditions are corrected. In this manner, the behavior of the internal combustion engine is improved for non-steady-state operating phases.

7 Claims, 2 Drawing Sheets

METHOD FOR CONTROLLING THE FUEL INJECTION IN AN INTERNAL COMBUSTION ENGINE

BACKGROUND OF THE INVENTION

FIELD OF THE INVENTION

The invention relates to a method for controlling an injection of fuel in an internal combustion engine. In accordance with a driver's request (gas pedal position) and input variables including engine speed, an injection parameter is chosen for the steady state operation of the internal combustion engine.

Such a method is described in German Patent DE 195 35 056 C1 corresponding to U.S. Pat. No. 5,680,842. The start-of-injection angle (injection timing) is controlled here by of an engine control unit which, in a characteristic diagram, determines the necessary injection information, in particular the start-of-injection angle, as a function of injection variables such as the position of the accelerator pedal and engine speed, in order to operate an internal combustion engine. This is usually effected by storing the necessary injection information in a characteristic diagram for various input variables. Such a characteristic diagram is as a rule optimum for the steady-state operating condition of the internal combustion engine, since the values contained in it originate, as a rule, from engine test bed trials. For non-steady-state operating conditions, i.e. for transitions from one steady-state operating condition into another condition, the values supplied by the characteristic diagram are not optimum, in particular in terms of exhaust emission behavior and fuel consumption. From the prior art it is known to use gradients of engine operating characteristic variables plotted over time, such as the desired value of the engine torque or engine speed, for example, in order to correct the values stored in the characteristic diagram for non-steady-state operating phases in order thus to achieve improved engine operating behavior. This is effected in that for the gradients of one or more engine operating parameters plotted over time, a corresponding characteristic diagram is provided whose values for non-steady-state operating phases can be used to correct the values of the characteristic diagram for steady-state operating phases. For the additional characteristic diagram it is necessary, on the one hand, to provide a corresponding memory module and, on the other hand, it is necessary to determine the values of the characteristic diagram experimentally.

Published, Non-Prosecuted German Patent Application DE 43 06 208 A1 discloses that the correction values are allowed to decay to zero. The correction values and the decay behavior are selected by accessing operating-parameter-dependent characteristic diagrams.

SUMMARY OF THE INVENTION

It is accordingly an object of the invention to provide a method for controlling the fuel injection in an internal combustion engine which overcomes the above-mentioned disadvantages of the prior art methods of this general type, in which the need for an additional characteristic diagram can be dispensed with.

With the foregoing and other objects in view there is provided, in accordance with the invention, a method for controlling a fuel injection in an internal combustion engine, which includes: determining a driver's request and input variables including engine speed; outputting an injection parameter stored in a control unit of an internal combustion engine for a steady-state operation of the internal combustion engine in dependence on the driver's request and the input variables; and modifying the injection parameter with a correction value produced in a correction element using a mathematical operation for improving operating behavior a non-steady-state operating condition.

According to the invention, the injection parameters for non-steady-state operating conditions of the internal combustion engine which are obtained from a characteristic diagram are corrected using the output value of the transmission element. The correct correction behavior is obtained by suitably selecting the transmission element and setting its time constant. As a result, the additional characteristic diagram for determining the correction values and the experimental determination of the actual correction values can be dispensed with.

A further advantage of the method according to the invention lies in the fact that the transmission element does not rely on operating parameters of the internal combustion engine but rather uses a control variable of the internal combustion engine as an input variable. That is to say, the transmission element is not supplied with a system response, and consequently does not need to wait for this response and is therefore faster.

In accordance with an added feature of the invention, there is the step of using a transmission element as the correction element in the modifying step.

In accordance with an additional feature of the invention, there is the step of providing the driver's request as an input variable for the correction element in the modifying step.

In accordance with another feature of the invention, there is the step of using the injection parameter as an input variable for the correction element in the modifying step.

In accordance with a further added feature of the invention, there is the step of additively combining a correction value and the injection parameter in the modifying step.

In accordance with a concomitant feature of the invention, there is the step of using a differential element with a time constant as the transmission element or using a differential element with two time constants as the transmission element.

Other features which are considered as characteristic for the invention are set forth in the appended claims.

Although the invention is illustrated and described herein as embodied in a method for controlling the fuel injection in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
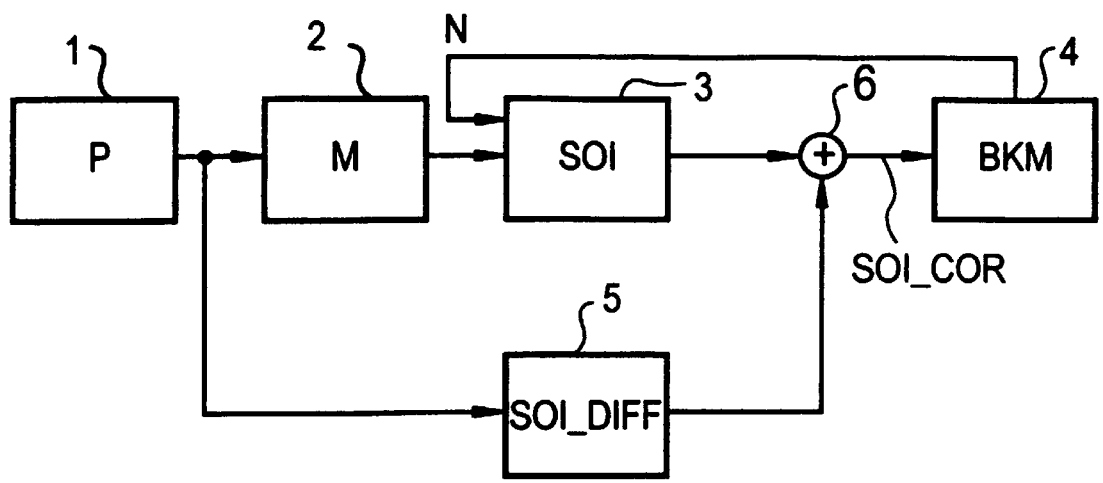
FIG. 1 is a block diagram of a method for controlling an injection of fuel according to the invention.

Referring now to the figures of the drawing in detail and first, particularly, to FIG. 1 thereof, there is shown a preferred embodiment of the method according to the invention for controlling a fuel injection in an internal combustion engine 4. A driver's request is expressed by a value P of a sensor 1 of an accelerator pedal and is fed to a characteristic diagram 2, which determines from it an overall mass M of fuel to be injected. The mass M value is fed to a characteristic diagram 3. In addition, the characteristic diagram 3 is provided with a current speed N of the internal combustion engine (BKM) 4. From the values N and M, the characteristic diagram 3 determines a start-of-injection angle SOI (injection timing). The start-of-injection angles SOI which are stored in the characteristic diagram 3 and which relate to the input variables M and N were determined under steady-state conditions. The output of the characteristic diagram 3 thus represents the optimum start-of-injection angle for steady-state operating conditions of the internal combustion engine 4.

For non-steady-state operating conditions of the internal combustion engine, i.e. for changes in load or engine speed, the start-of-injection angles SOI determined by the characteristic diagram 3 are not optimum in terms of criteria such as generation of noise, fuel consumption or exhaust emission behavior.

In order to obtain optimum start-of-injection angles for non-steady-state operating conditions, there is, according to the invention, provision of a transmission element 5. The transmission element 5 receives the signal P of the sensor 1 as an input variable. The transmission element 5 carries out a mathematical operation based on the input variable P. The mathematical operation may be, for example, a delayed differentiation (DT1 element). The transmission element 5 determines a correction value SOI_DIFF from its input variable P. With the correction value SOI_DIFF and the start-of-injection angle SOI output by the characteristic diagram 3, the start-of-injection angles SOI_COR is determined in an adder stage 6 for the non-steady-state condition of the internal combustion engine 4. The start-of-injection angles SOI_COR which are now obtained are optimum for the non-steady-state operating condition of the internal combustion engine 4, in particular in terms of the production of noise, fuel consumption or exhaust emission behavior. The influencing of the starting angles can act on all injections. Possible injections here are the preliminary injection and main injection, or just one of the two.

Figure 2A:
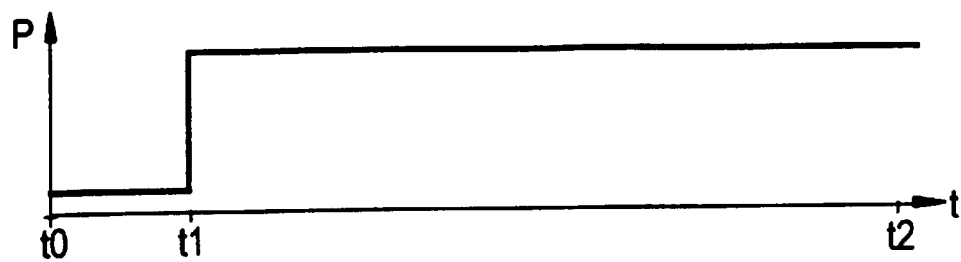
FIG. 2a is a graph of a profile of a pedal sensor value P.
Figure 2B:
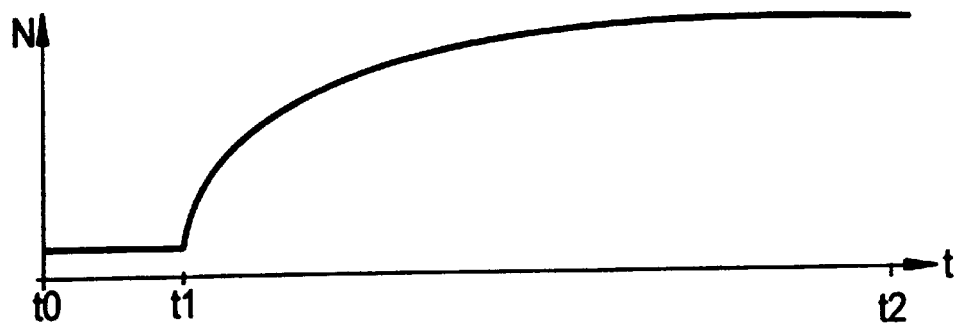
FIG. 2b is a graph of a variation in engine speed.
Figure 2C:
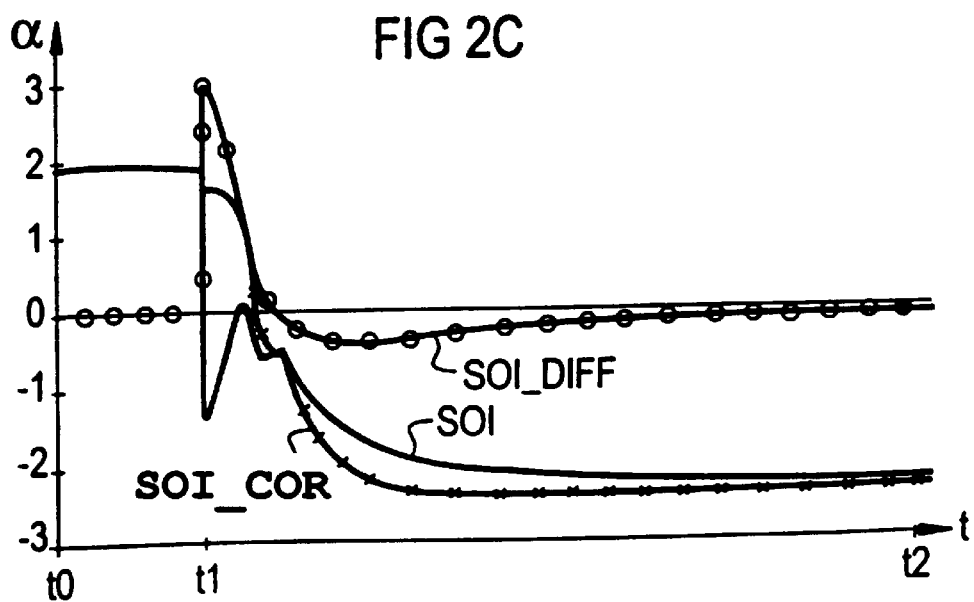
Fig. 2c is a graph of an injection angle.

FIGS. 2a–2c illustrate a profile, plotted over time, of parameters for the method according to the invention. The time is plotted on the X axis and the corresponding parameter values are plotted on the Y axis. Thus, in FIG. 2a the value P of the sensor 1, in FIG. 2b the engine speed N, and in FIG. 2c an injection angle α are plotted on the Y axis. At the time $t_1$, the driver wishes to increase the engine speed. The value P corresponding to the driver's request increases abruptly to a higher value. Up to this time, the fuel injection of the internal combustion engine 4 took place at the start-of-injection angle SOI. The correction SOI_DIFF supplied by the correction element 5 was zero, since the value P was constant and there was thus a steady-state operating condition. With the abrupt change in the value P, a non-steady-state operating condition comes about. The start-of-injection angles SOI which are optimum in the steady-state condition are corrected with the value SOI_DIFF supplied by the transmission element 5 to form start-of-injection angles SOI_COR which are optimum for the non-steady-state operating condition. To determine the correction values SOI_DIFF, the transmission element 5 uses the value P derived from the driver's request. The behavior of the transmission element 5, and thus the profile of the curve SOI_DIFF, can be influenced by suitably selecting the transmission element 5 and setting time parameters of the transmission element 5.

The possible transmission elements are:
DT1—Differential element with a time constant;
DT2—Differential element with two time constants;
PDT1—Proportional differential element with a time constant; and
PDT2—Proportional differential element with two time constants.

The differentiating behavior of the transmission element 5 is defined by the fact that its output signal is proportional after the decay of all the transition processes of the derivation of the input signal over time. A transmission element 5 in which, in the steady state, the output variable has a linear dependence on the input variable, has proportional behavior. In addition, the described PDT and DT transmission elements 5 have one or two further time constants by which the time behavior with which the transmission element 5 reacts to a change in the input variable can be set. Depending on the setting of the time behavior, different amounts of time will pass between the point at which an input variable jumps to a new constant value and the point at which the injection correction value SOI_DIFF has become zero again. In this case, the corrected start-of-injection angle SOI_COR corresponds to the start-of-injection angle SOI supplied by the characteristic diagram 3, for the steady-state operating condition. After the time $t_2$, a steady-state operating condition is again attained, and the engine speed N has risen and remains constant. The correction value SOI_COR of the transmission element 5 has returned to zero and the internal combustion engine is operated with the start-of-injection angle SOI that is optimum for the steady-state operating condition.

Figure 3:
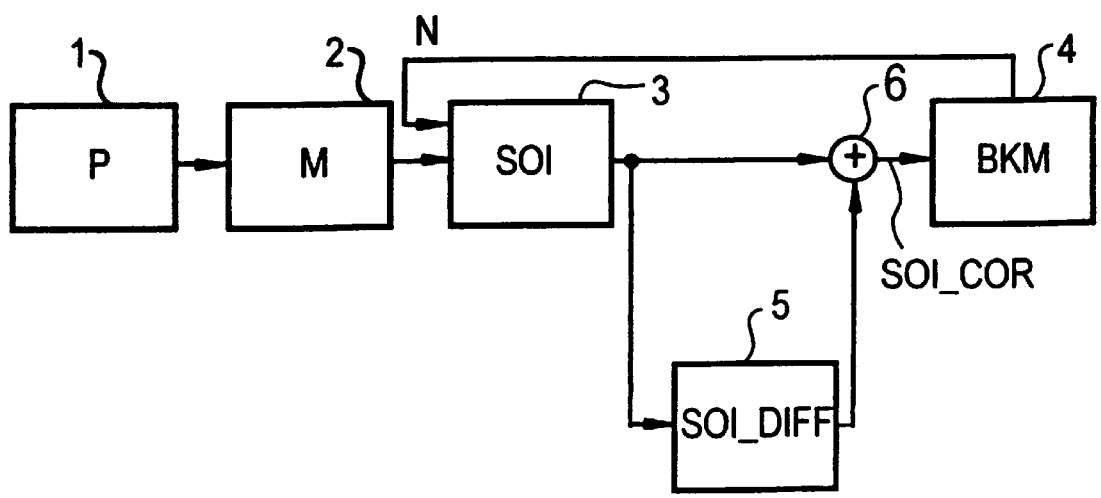
FIG. 3 is a block diagram for a different exemplary embodiment of the method.

FIG. 3 represents an alternative embodiment of the method according to the invention for controlling the injection parameters of an internal combustion engine 4. The elements that are designated with the reference numerals 1, 2, 3, 4 and 5 correspond to those in FIG. 1. Analogously to the method represented in FIG. 1, a start-of-injection angle SOI is determined from a characteristic diagram that is optimum for steady-state operating conditions of the internal combustion engine 4. For the purpose of adaptation to non-steady-state operating conditions, a correction SOI_DIFF is determined for the start-of-injection angle by a transmission element 5. In contrast with the exemplary embodiment according to FIG. 1, the value P of the sensor 1 is, however, not used as input variable of transmission element 5 but rather the start-of-injection angle SOI that is optimum for the steady-state condition is used.

We claim:
1. A method for controlling a fuel injection in an internal combustion engine, which comprises the steps of:
   determining a driver's request and input variables including engine speed;
   outputting an injection parameter stored in a control unit of an internal combustion engine for a steady-state operation of the internal combustion engine in dependence on the driver's request and the input variables;
   producing a correction value in a transmission element using a mathematical operation without additional characteristic diagrams for improving operating behavior during a non-steady-state operating condition; and modifying the injection parameter with the correction value.

2. The method according to claim 1, wherein the producing step is performed by producing a correction value in a transmission element and setting a time constant of the transmission element.

3. The method according to claim 1, wherein the producing step is performed by providing the driver's request as an input variable for the transmission element.

4. The method according to claim 1, wherein the producing step is performed by using the injection parameter as an input variable for the transmission element.

5. The method according to claim 1, wherein the modifying step is performed by adding the correction value and the injection parameter.

6. The method according claim 2, wherein the producing step is performed by using a differential element with a time constant as the transmission element.

7. The method according to claim 2, wherein the producing step is performed by using a differential element with two time constants as the transmission element.

* * * * *